US011573581B2

(12) United States Patent
Wilson et al.

(10) Patent No.: US 11,573,581 B2
(45) Date of Patent: Feb. 7, 2023

(54) COMMERICAL TOUCHLESS SENSOR BATH FAUCET WITH INTEGRAL THERMOSTATIC VALVE

(71) Applicant: Kohler Co., Kohler, WI (US)

(72) Inventors: John M. Wilson, Howards Grove, WI (US); Andrew D. Klinger, Kohler, WI (US); Joseph F. Smies, Kohler, WI (US); Balachander Venugopal, Kohler, WI (US)

(73) Assignee: KOHLER CO., Kohler, WI (US)

( * ) Notice: Subject to any disclaimer, the term of this patent is extended or adjusted under 35 U.S.C. 154(b) by 167 days.

(21) Appl. No.: 17/119,458

(22) Filed: Dec. 11, 2020

(65) Prior Publication Data

US 2021/0191432 A1 Jun. 24, 2021

Related U.S. Application Data

(60) Provisional application No. 62/951,931, filed on Dec. 20, 2019.

(51) Int. Cl.
  *G05D 11/03* (2006.01)
  *E03C 1/04* (2006.01)
(52) U.S. Cl.
  CPC .............. *G05D 11/03* (2013.01); *E03C 1/04* (2013.01)
(58) Field of Classification Search
  CPC ....... G05D 11/03; G05D 23/022; E03C 1/041
  See application file for complete search history.

(56) References Cited

U.S. PATENT DOCUMENTS

| 4,886,207 A | 12/1989 | Lee et al. |
| 5,309,940 A | 5/1994 | Delabie et al. |
| 6,019,130 A | 2/2000 | Rump |
| 6,513,787 B1 | 2/2003 | Jeromson et al. |
| 6,517,006 B1 | 2/2003 | Knapp |
| 7,083,156 B2 | 8/2006 | Jost et al. |
| 8,118,240 B2 | 2/2012 | Rodenbeck et al. |

(Continued)

FOREIGN PATENT DOCUMENTS

DE 10 2013 001 379 7/2014

OTHER PUBLICATIONS

International Search Report on PCT/US2020/013865 dated May 8, 2020; 3 pages.
Malatesta, "Tech Topic: Scald Protection" Jun. 22, 2017.

*Primary Examiner* — J C Jacyna
(74) *Attorney, Agent, or Firm* — Foley & Lardner LLP

(57) ABSTRACT

A thermostatic integrated faucet includes a valve assembly having an upper valve body and a lower valve body defining a mixing chamber therein, the mixing chamber configured to receive hot water through a hot water inlet and cold water through a cold water inlet. The thermostatic integrated faucet further includes a diaphragm assembly fluidly coupled to the mixing chamber, a sensor operatively coupled to the diaphragm assembly, a thermostatic unit disposed within the mixing chamber of the valve assembly, and a cam shaft coupled to the thermostatic unit. The thermostatic unit is configured to control a water temperature within the valve assembly and the cam shaft configured to control a range of the water temperature within the valve assembly. In various embodiments, the thermostatic unit includes a wax actuator configured to engage with the cam shaft and a mixing shuttle coupled to the wax actuator.

19 Claims, 13 Drawing Sheets

(56) References Cited

U.S. PATENT DOCUMENTS

| | | |
|---|---|---|
| 8,438,672 B2 | 5/2013 | Reeder et al. |
| 10,119,253 B2 | 11/2018 | Seggio et al. |
| 10,167,964 B1 | 1/2019 | Chang |
| 2013/0248019 A1 | 9/2013 | Frick et al. |
| 2013/0291947 A1* | 11/2013 | Chandler .............. E03C 1/0404 |
| | | 4/678 |
| 2015/0355648 A1 | 12/2015 | Tempel et al. |
| 2016/0018010 A1* | 1/2016 | Forrestal ................ F16K 11/07 |
| | | 236/12.1 |
| 2021/0325918 A1* | 10/2021 | Ottelli ................... E03C 1/0412 |

* cited by examiner

COMMERICAL TOUCHLESS SENSOR BATH FAUCET WITH INTEGRAL THERMOSTATIC VALVE

CROSS-REFERENCE TO RELATED PATENT APPLICATION

This application claims the benefit of and priority to U.S. Patent Application No. 62/951,931, filed Dec. 20, 2019, the entire disclosure of which is hereby incorporated by reference herein.

BACKGROUND

The present application relates generally to a commercial touchless faucet including a thermostatic valve or anti-scald device disposed within the faucet body.

Existing touchless faucets include valves to control the mixture of hot and cold water delivered from the faucet. Some faucets also include a thermostatic valve structured to limit the maximum temperature of hot water entering the valve; however, existing designs do not permit control of the thermostatic element within the valve to customize temperature range of dispensed water. Furthermore, existing designs do not feature valve configurations wherein the thermostatic element is integrated within the water mixing mechanism.

It would be advantageous to provide an improved touchless faucet that includes an integrated, controllable thermostatic valve or anti-scald device disposed within the faucet body.

SUMMARY

One aspect of the disclosure relates to a thermostatic integrated faucet including a valve assembly having an upper valve body and a lower valve body defining a mixing chamber therein, the mixing chamber configured to receive hot and cold water through a hot water inlet and a cold water inlet, respectively. The thermostatic integrated faucet further includes a diaphragm assembly fluidly coupled to the mixing chamber, a sensor operatively coupled to the diaphragm assembly, a thermostatic unit disposed within the mixing chamber of the valve assembly, and a cam shaft coupled to the thermostatic unit, the cam shaft configured to control a range of the water temperature within the valve assembly. The diaphragm assembly is configured to control a water flow through the valve assembly responsive to an input received by the sensor and the thermostatic unit is configured to control a water temperature within the valve assembly.

In various embodiments, the thermostatic unit includes a wax actuator configured to engage with the cam shaft and mixing shuttle coupled to the wax actuator. In various embodiments, the mixing shuttle comprises one or more fins that are configured to facilitate mixing of water within the mixing chamber. In some embodiments, the wax actuator is biased toward the cam shaft by a spring. In some embodiments, the spring is configured to interface with an upper surface of the mixing chamber and a lip of the wax actuator. In yet other embodiments, the thermostatic unit is configured control the water temperature within the mixing chamber by obscuring the hot water inlet based on a temperature of water within the mixing chamber. In various embodiments, the sensor is disposed adjacent a faucet outlet. In some embodiments, the diaphragm assembly is configured to be activated by a solenoid assembly responsive to the input received by the sensor. In various embodiments, the cam shaft is coupled to a handle that is configured to rotate the cam shaft, wherein rotating the cam shaft adjusts the range of the water temperature within the valve assembly.

Another aspect of the disclosure relates to a thermostatic integrated faucet including a valve assembly having an upper valve body and a lower valve body defining a mixing chamber, the mixing chamber configured to receive hot water through a hot water inlet and cold water through a cold water inlet. The thermostatic integrated faucet further includes a wax actuator disposed within the mixing chamber, a mixing shuttle coupled to the wax actuator within the mixing chamber and a cam shaft coupled to the thermostatic unit. The wax actuator is configured to adjust a position of the mixing shuttle to control a water temperature within the mixing chamber and the cam shaft is configured such that rotation of the cam shaft determines a range of the water temperature.

In various embodiments, the thermostatic integrated faucet further includes a diaphragm assembly fluidly coupled to the mixing chamber and a sensor operatively coupled to the diaphragm assembly, wherein the diaphragm assembly is configured to control a water flow through the valve assembly responsive to an input received by the sensor. In some embodiments, the wax actuator is configured to expand in response to an increase in temperature of water within the mixing chamber. In some embodiments, the mixing shuttle is configured to obscure a hot water inlet fluidly coupled to the mixing chamber responsive to expansion of the wax actuator. In various embodiments, the wax actuator is coupled to the mixing shuttle at a ridged interface. In yet other embodiments, the wax actuator comprises a pin portion that is configured to engage with the cam shaft. In various embodiments, the cam shaft is coupled to a handle at a knob portion, wherein the knob portion comprises one or more splines that are configured to engage with the handle. In some embodiments, the wax actuator is biased toward the cam shaft via a spring. In various embodiments, the spring is disposed within the mixing chamber such that the spring interfaces with an upper surface of the mixing chamber and a lip of the wax actuator.

Yet another aspect of the disclosure relates to a method for controlling a temperature of water within a faucet, wherein the method includes sensing, by a sensor within the faucet, a first signal indicative of a user proximity. The method further includes, sending, by the sensor, a second signal to a solenoid assembly responsive to the sensed first signal, wherein the solenoid assembly is coupled to a diaphragm assembly. The method also includes controlling, by the solenoid assembly, the diaphragm assembly to open a water passageway in fluid communication with a valve assembly. The valve assembly includes an upper valve body and a lower valve body defining a mixing chamber that is configured to receive hot and cold water, a thermostatic unit disposed within the mixing chamber and configured to control a water temperature within the valve assembly, and a cam shaft coupled to the thermostatic unit and configured to control a range of the water temperature within the valve assembly.

In various embodiments, the thermostatic unit comprises an expandable wax actuator coupled to a mixing shuttle and configured to engage with the cam shaft, wherein the expandable wax actuator displaces the mixing shuttle as it expands upon reaction with the hot water, and wherein an amount of expansion of the expandable wax actuator is determined based on a rotation of the cam shaft.

DETAILED DESCRIPTION

Figure 1:
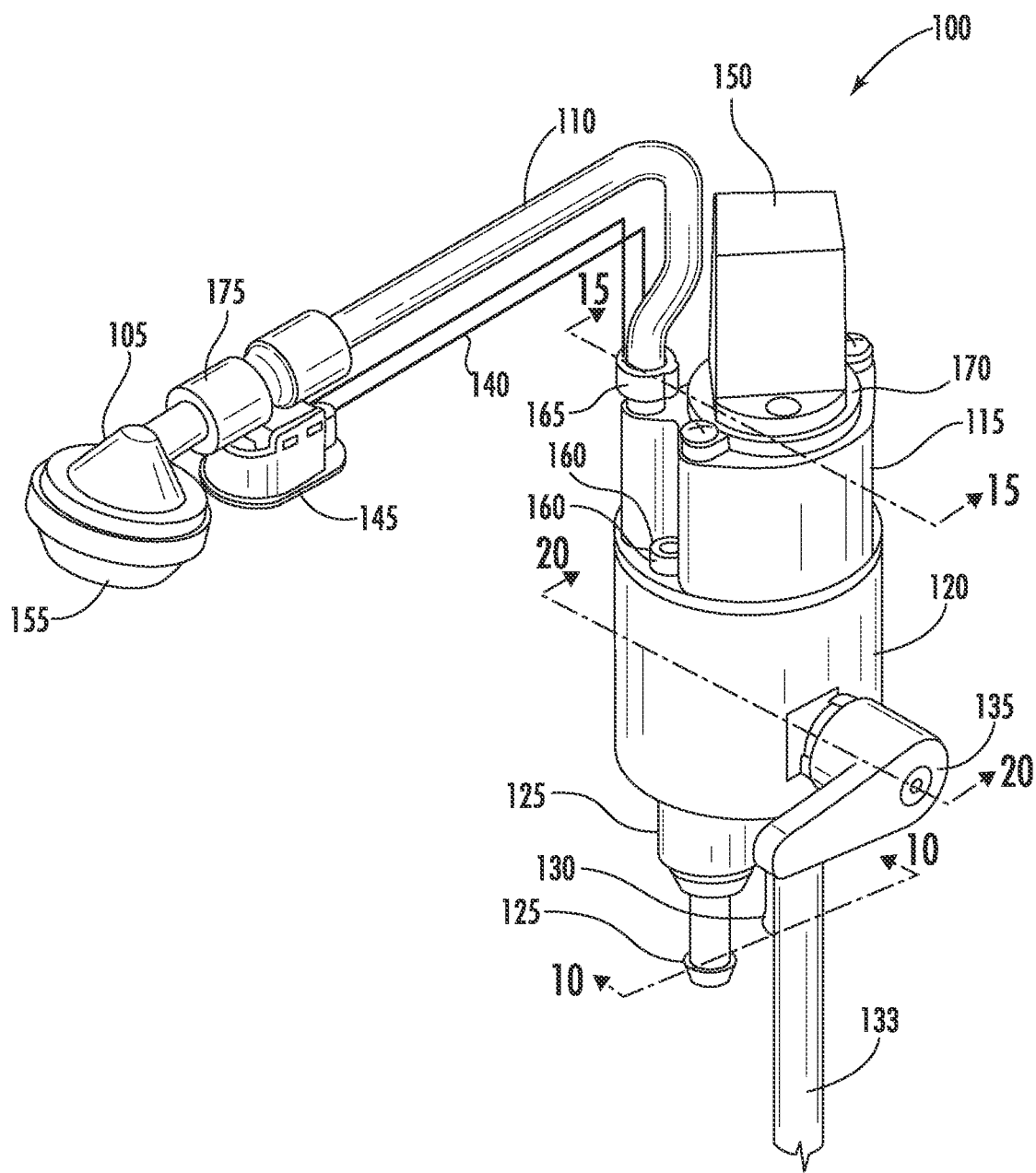
FIG. 1 is a perspective view of a thermostatic integrated faucet, according to an exemplary embodiment.

One embodiment relates to a faucet that includes hot and cold water flow passages that are each fluidly connected to a mixing chamber. The amount of water entering the mixing chamber from each one of the hot and cold flow passages is controlled based on a position of an integral mixing shuttle. The mixing shuttle is fixedly coupled to a thermostatic valve or element that contains a material (e.g., wax), which is reactive to the temperature of water passing over the element to adjust the position of the element and shuttle. The position of the thermostatic valve (and mixing shuttle) within the mixing chamber determines the amount of hot and cold water introduced into the mixing chamber from the hot and cold flow passages. The position of the thermostatic valve can be adjusted by a cam shaft that contacts the bottom of the thermostatic valve. Specifically, rotation of the cam shaft (through rotating a handle on an outer end of the cam shaft) in-turn changes the vertical position of the thermostatic valve by contact between a cam of the camshaft and the bottom of the thermostatic valve. The configuration of the thermostatic valve (and mixing shuttle), coupled with the rotating cam shaft, facilitate increased temperature control of water flowing out of the faucet in that the maximum allowable temperature of water may be adjusted by a user to accommodate the user's preferences.

Another embodiment relates to the thermostatic valve biased toward the cam shaft by a spring. The position of the thermostatic valve sets the maximum temperature of (hot) water exiting the valve to try to prevent scalding. Hot water entering the chamber reacts with a wax element within the thermostatic valve. If the water is above a predefined threshold, the wax element expands, pushing the thermostatic valve and the mixing shuttle upwards towards the closed position of the inlet of the hot water passage to reduce the amount of hot water delivered to the mixing chamber. In addition to enabling control of hot and cold water inflow ratios based on user-selected maximum temperature settings, integrating the thermostatic valve into the mixing chamber reduces the overall footprint of the faucet (e.g., a required outer diameter at the base of the faucet). A sensor (e.g., a touchless flow control sensor) for the faucet is disposed within the spout of the faucet, rather than in the base, to further reduce the overall footprint of the faucet.

According to an exemplary embodiment, a faucet includes an integrated thermostatic valve element that is coupled to a rotating cam shaft for the adjustment and setting of water temperature flowing through the faucet to both meet user preferences and prevent scalding. In addition, the integrated thermostatic valve element is aligned vertically with the main axis of the faucet spout body base, which may enable reduced faucet size as compared to faucets in which thermostatic valves are arranged horizontally and perpendicular to the base. Such a configuration may also require a reduced number of parts, simplify the assembly process, and provide improved serviceability above the deck.

According to an exemplary embodiment, the faucet also includes a unique temperature adjustment method, whereby a user can adjust the outlet water temperature by turning a unique horizontal camshaft that presses against the thermostatic valve element piston. These and other advantageous features will be apparent to those reviewing the present disclosure.

Referring generally to the figures, a thermostatic integrated faucet system includes a platform valve, a mixing chamber disposed within the body of the valve that includes hot and cold water inlets, and a controllable diaphragm coupled to the valve that enables flow of mixed water through faucet spout tubing. The mixing chamber contains a thermostatic wax actuator that is coupled with a mixing shuttle and expands with increasing temperature or when a threshold has been reached. The thermostatic wax actuator is further coupled to a cam shaft that extends from an end of the actuator to the exterior of the valve body. The thermostatic wax actuator is configured such that rotation of the cam shaft adjusts the actuator position, which causes a change in position of the mixing shuttle within the mixing chamber. The position of the mixing shuttle meters the flow of hot water into the mixing chamber, and therefore determines the ratio of hot to cold water within the mixing chamber. The position of the mixing shuttle, and the corresponding ratio of hot to cold water, can be set by a user via rotation of the cam shaft to prevent scalding. After hot and cold water is mixed within the mixing chamber, the valve may facilitate the outflow of water through the faucet spout tubing.

In various exemplary embodiments, the system is configured such that the diaphragm assembly is coupled to a solenoid assembly. The coupled solenoid assembly may, in response to an input, cause a diaphragm within the diaphragm assembly to open, thereby allowing water to flow through the diaphragm and valve assemblies.

In various exemplary embodiments, the system includes a sensor coupled to faucet spout tubing near the outlet aerator. The sensor may be configured to control the diaphragm assembly such that the sensor causes the diaphragm assembly to permit water flow through the platform valve in response to a signal (e.g. proximity, movement, infrared).

In various exemplary embodiments, the system is configured such that the cam shaft sets relative temperature ranges for the system operation, such as "cold" or "hot" settings. For example, when the cam shaft is adjusted to correspond to a "cold" setting, the mixing shuttle may be correspondingly positioned to close or restrict the hot water inlet into the mixing chamber. Alternatively, when the cam shaft is adjusted to correspond to a "hot" setting, the mixing shuttle may be correspondingly positioned to allow increased hot water flow into the mixing chamber. In various exemplary embodiments, the system includes a rotatable handle coupled to an exterior end of the camshaft to allow controlled adjustment of the camshaft, and consequently, the mixing shuttle. The system is configured such that the ratio of hot and cold water inputs can be adjusted to output mixed water within an acceptable temperature range that helps prevent scalding. Adjustments to the ratio of inflowing hot and cold water reduce risk of scalding by limiting the mixed water temperature and/or by significantly reducing water outlet flow.

In various exemplary embodiments, the system is configured to be adaptable to a variety of existing faucet systems. In other various exemplary embodiments, the system is configured to enable ease of assembly and maintenance. For example, the cam shaft may be configured to include features, such as tabs, that aid with its installation and servicing. Alternatively, or in addition, the cam shaft may have a sloped end that permits its insertion and removal from the system without requiring removal of additional components. In some implementations, the orientation of the wax actuator within the valve assembly is sufficient to enable the assembly to be installed in a variety of existing faucet setups. These and other advantageous features will become apparent to those reviewing the present disclosure and figures.

Turning now to the accompanying figures, and referring specifically to FIG. 1, a perspective view of a thermostatic integrated faucet system 100 is shown, according to an exemplary embodiment. The system 100 may be an above-deck (i.e., functional system portion is accessible within or above an installation surface) integrated faucet system installed to control water flow from an existing water supply. In FIG. 1, the system 100 receives water from an existing supply via hot and cold water conduits or hoses 125 and 130, respectively. The water hoses 125 and 130 direct water to lower valve body 120 and upper valve body 115, which are mutually coupled via fastener 160. Fasteners 160 may be screws, pins, rivets, or any other fastener type sufficient for conjoining valve bodies 115 and 120.

The ratio of mixed hot and cold water (received through hoses 125 and 130), and therefore a temperature of water, routed through valve bodies 120 and 115 is controlled by handle 135, which rotates relative to lower valve body 120. Upper valve body 115 is coupled to diaphragm assembly 170, which controls mixed water flow out of upper and lower valve bodies 115 and 120 into faucet spout conduit or tubing 110. Diaphragm assembly 170 is operated by a coupled solenoid assembly 150 in response to input received at the solenoid assembly 150, via wires 140, from a sensor within a sensor housing 145. Upon receipt of input at the solenoid assembly 150 from a sensor within sensor housing 145 (via wires 140), diaphragm assembly 170 allows mixed water to flow into tubing 110, which is coupled to upper valve body 115 via a coupler or tubing clamp 165. Mixed water subsequently flows from faucet spout tubing 110 through faucet outlet 105, which is coupled to tubing 110 via quick connector 175, to exit system 100 via aerator 155. As described, the temperature of the mixed water exiting the system 100 is controlled by rotation of the handle 135.

In various exemplary embodiments, the sensor within sensor housing 145 may be directly or indirectly coupled to tubing 110. In other exemplary embodiments, the sensor within housing 145 may be mounted substantially closer to aerator 155 relative to valve bodies 115 and 120. In various embodiments, the sensor within the sensor housing 145 may be disposed near the valve bodies 115 and 120. In various implementations, sensor housing 145 may contain a sensor configured to detect at least one of proximity, motion, infrared radiation, etc.

Figure 2:
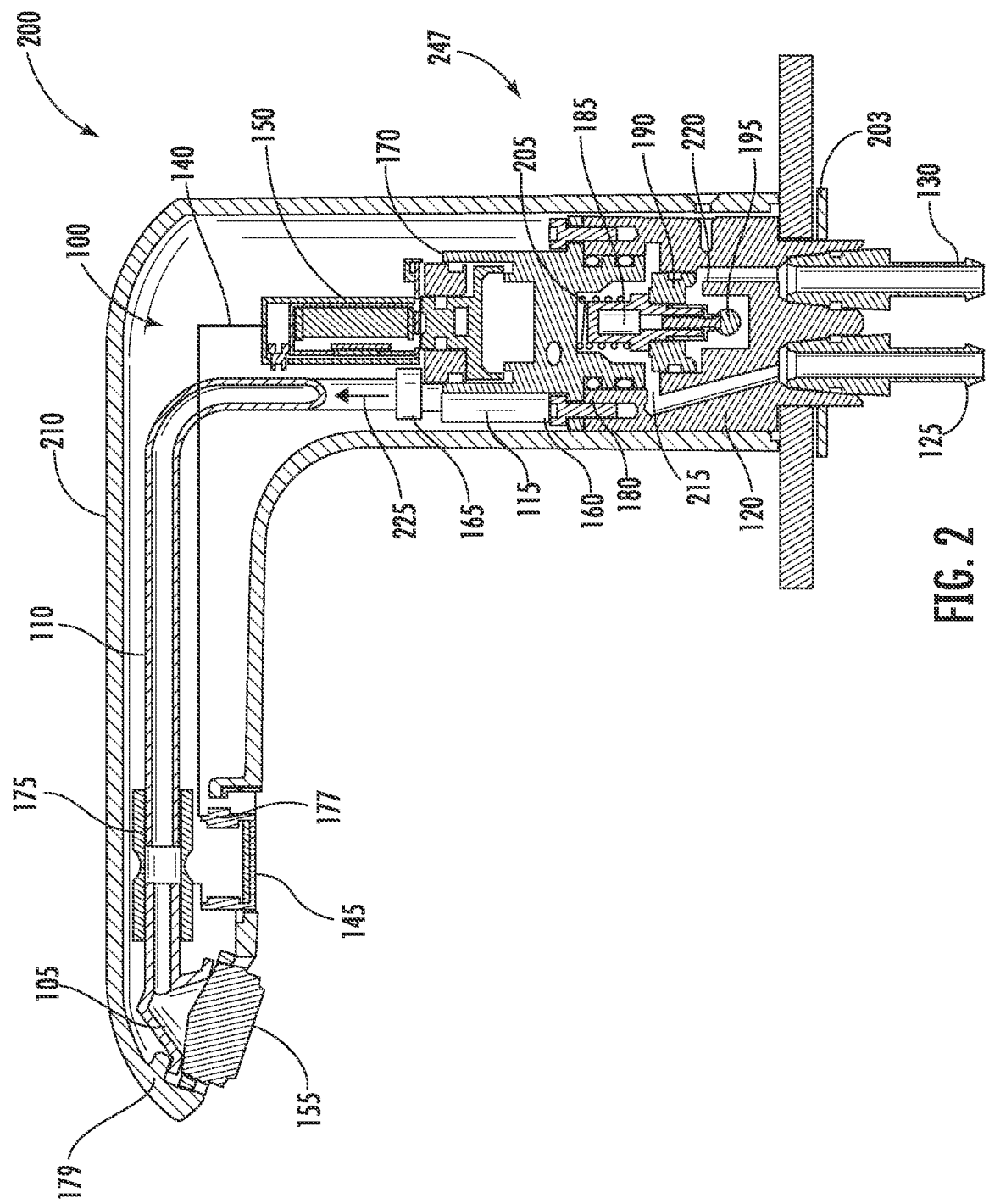
FIG. 2 is a side cross-sectional view of a thermostatic integrated faucet assembly including the thermostatic integrated faucet of FIG. 1, according to an exemplary embodiment.

FIG. 2 shows a side cross-sectional view of an integrated thermostatic faucet assembly 200 containing integrated thermostatic faucet system 100, according to an exemplary embodiment. The assembly 200 is affixed to a mounting surface or "deck" (e.g., a countertop) via valve deck clamp 203. Assembly 200 includes a faucet spout body 210, which houses system 100. The base of faucet spout body 210 is substantially hollow, enabling valve bodies 115 and 120 to be disposed therein. Attachment fixtures 177 and 179, which are located on an interior surface of faucet spout body 210, facilitate the coupling of the sensor within housing 145 and aerator 155, respectively. Attachment fixture 177 may be a protrusion, a bracket, or another suitable feature located on an interior surface of body 210 to which sensor housing 145 may be attached (e.g. via one or more fasteners). Attachment fixture 179 is located near a terminal end of body 210, on an interior surface. Attachment fixture 179 may be a protrusion, bracket, or other shaped feature within body 210 that enables accurate placement and installation of aerator 155, which is coupled to faucet outlet 105.

During operation, the sensor within sensor housing 145 sends a signal, via one or more wires 140, to solenoid assembly 150 in response to a detection (e.g. presence of a user, proximity of a hand, etc.). Solenoid assembly 150 consequently causes diaphragm assembly 170 to open water passageways therein, allowing mixed hot and cold water from mixing chamber 205 to flow in direction 225 into faucet spout tubing 110. Mixed water within faucet spout tubing subsequently exits assembly 200 through outlet 105 and coupled aerator 155.

Assembly 200 receives water from an existing water supply to the lower valve body 120 of system 100 via hoses 125 and 130. Hot water received through hose 125 enters mixing chamber 205 via hot water inlet 215. Cold water received through hose 130 enters mixing chamber 205 via cold water inlet 220. The mixing chamber 205 is disposed within upper valve body 115 and lower valve body 120, which are mutually coupled via fasters 160. O-rings 180 are located between the interfacing surfaces of valve bodies 115 and 120 to fluidly seal mixing chamber 205 and prevent mixed water from prematurely exiting system 100.

The ratio of hot and cold water entering mixing chamber 205 is metered by a position of mixing shuttle 190 (disposed within the mixing chamber 205) relative to hot water inlet 215 and, more specifically, an amount or degree of obscuration of the inlet 215 opening by the body of mixing shuttle 190. The position of mixing shuttle 190 is determined by wax actuator 185 and coupled cam shaft 195. Water mixed within mixing chamber 205 reacts with thermostatic wax actuator 185, which causes thermostatic wax actuator 185 to expand, causing an adjustment of the position of coupled mixing shuttle 190 such that it progressively seals off hot water inlet 215, thereby stymieing hot water flow into mixing chamber 205. The configuration of the thermostatic wax valve 185 within assembly 200 enables the control and setting of maximum water temperatures through system 100 via rotation of cam shaft 195. Accordingly, the thermostatic actuator 185 and the mixing shuttle 190 form a thermostatic unit within the valve assembly 247 to control water flow into the mixing chamber 205 and thus water temperature exiting the integrated thermostatic faucet system 100.

Figure 5:
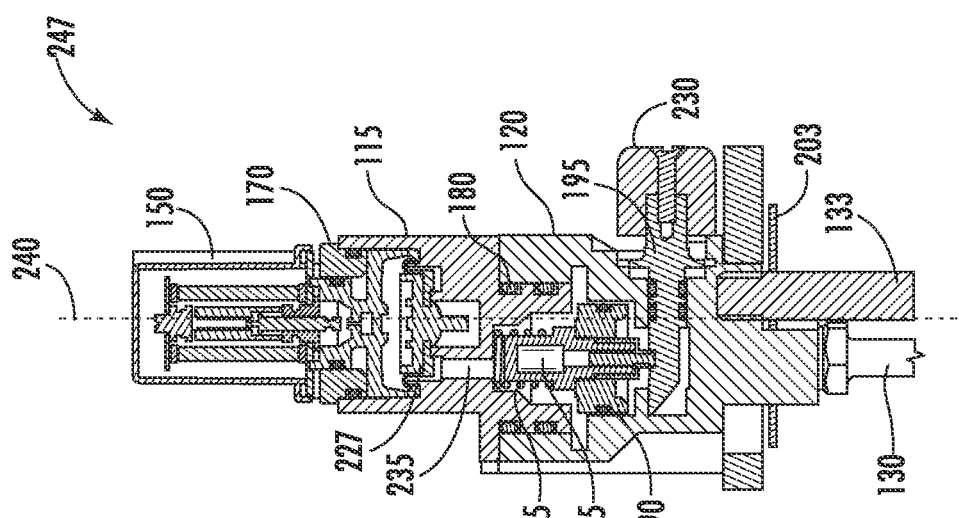
FIG. 5 is a cross-sectional view of a thermostatic integrated valve of FIG. 3 taken along line 20-20 of FIG. 1, according to an exemplary embodiment.
Figure 4:
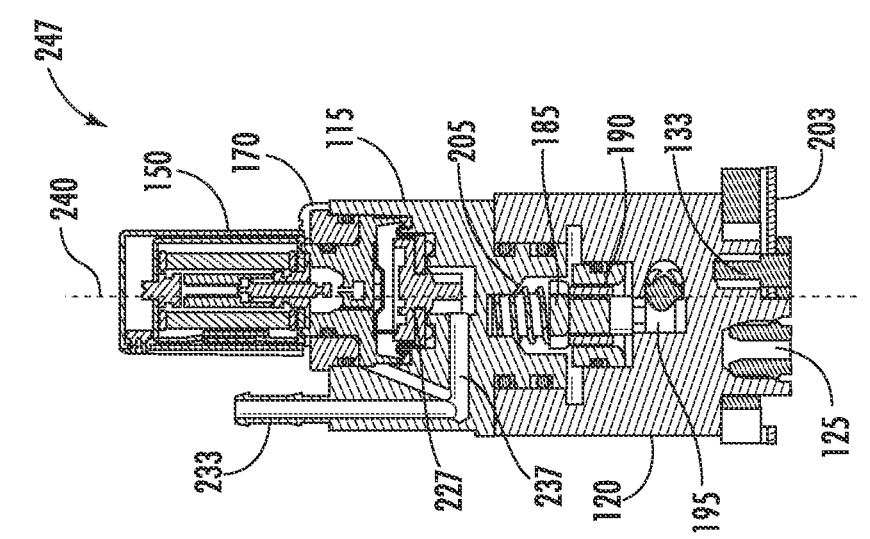
FIG. 4 is a cross-sectional view of a thermostatic integrated valve of FIG. 3 taken along line 15-15 of FIG. 1, according to an exemplary embodiment.
Figure 3:
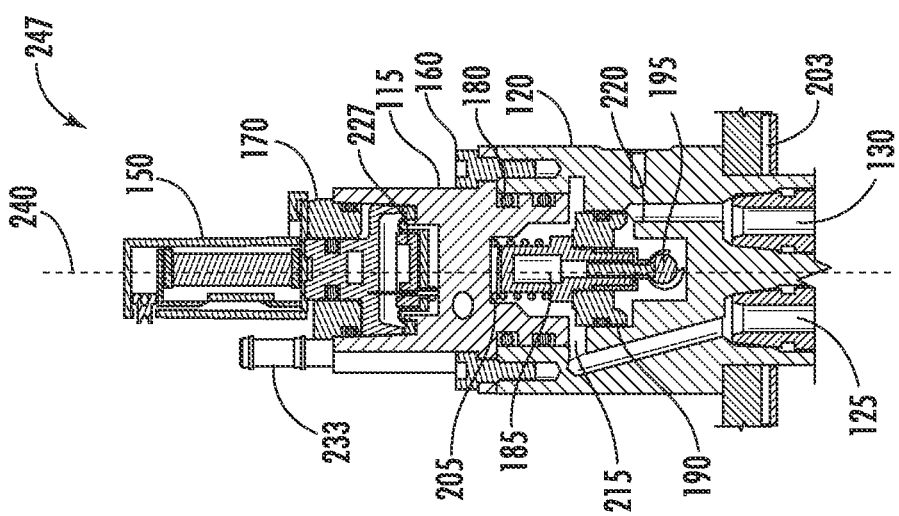
FIG. 3 is a cross-sectional view of a thermostatic integrated valve of the thermostatic integrated faucet of FIG. 1 taken along line 10-10 of FIG. 1, according to an exemplary embodiment.

FIGS. 3-5 show side cross-sectional views of valve assembly 247, which includes the thermostatic unit, according to exemplary embodiments. FIG. 3 shows a cross-section of valve assembly 247 taken along line 10-10 of FIG. 1, in a plane defined substantially by hoses 125 and 130 and substantially vertical axis 240. In FIG. 3, water hoses 125 and 130 are shown to be fluidly coupled to hot and cold water inlets 215 and 220, respectively. FIG. 3 shows an embodiment in which mixing shuttle 190 partially obscures the opening of hot water inlet 215 and consequently limits hot water flow into mixing chamber 205. FIG. 3 further shows the thermostatic unit, comprising mixing shuttle 190 coupled to thermostatic wax actuator 185, which engages with cam shaft 195, wherein the cam shaft 195 and the thermostatic wax actuator 185 control the position of mixing shuttle 190 within mixing chamber 205. In various embodiments, the cam shaft 195 may have a tapered surface to cause the wax actuator 185 to change in position with rotation of the cam shaft 195. After mixing, mixed water from mixing chamber 205 may flow through diaphragm assembly 170. Diaphragm assembly 170 permits water flow when it has been activated by solenoid assembly 150 and diaphragm 227 is thus repositioned to open the water passageway.

FIG. 4 shows a side cross-sectional view of valve assembly 247 taken along line 15-15 of FIG. 1, in a plane defined by water hose 125, structural feature 133, and substantially vertical axis 240. The highlighted cross-section shown in FIG. 4 is substantially parallel to the cross-section shown in FIG. 3. FIG. 4 highlights water passageways exiting diaphragm assembly 170. When diaphragm 227 within diaphragm assembly 170 is activated in response to a signal from solenoid assembly 150, water may pass through and exit diaphragm assembly 170 via outlet passageway 237. Outlet passageway 237 is closed off until diaphragm 227 is activated. When open, outlet passageway 237 is fluidly coupled to outlet 233 from upper valve body 115. Mixed water consequently exits valve assembly 247 via upper valve body outlet 233 into the faucet outlet waterways (such as faucet spout tubing 110).

Figure 6:
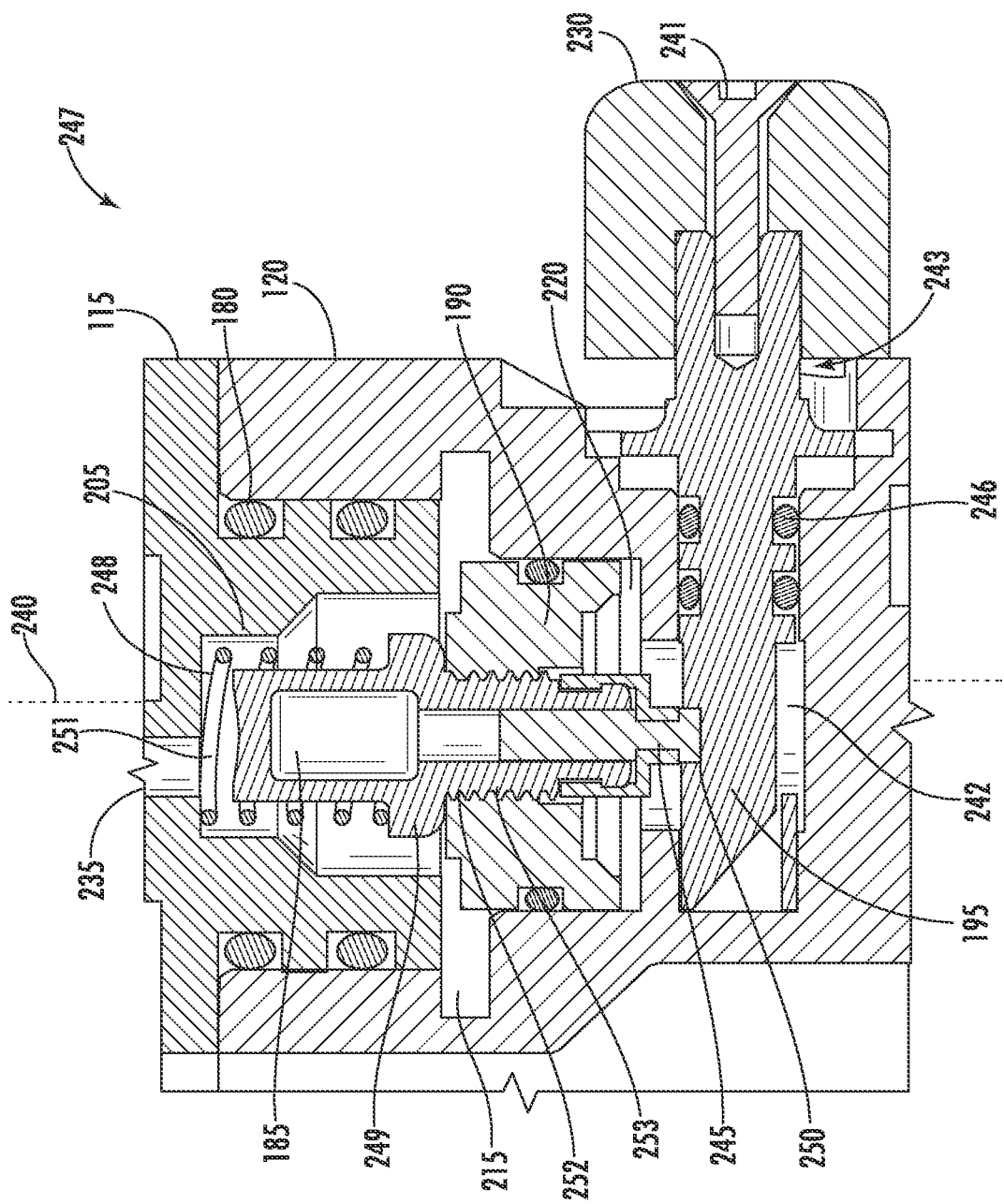
FIG. 6 is a reproduction of FIG. 5 near the wax actuator and cam shaft.

FIG. 5 shows a side cross-sectional view of valve assembly 247 taken along line 20-20 of FIG. 1, within a plane defined by water hose 130, structural feature 133 (e.g., fastener, bracket, post, etc.), and substantially vertical axis 240. FIG. 5 illustrates connectivity of cam shaft 195 and components of assembly 247 housed within mixing chamber 205. As shown in FIG. 5, cam shaft 195 may be rotated relative to lower valve body 120 via handle 230 (similar or equivalent to handle 135). Rotation of cam shaft 195 in turn adjusts the position of thermostatic wax actuator 185 and, consequently, the position of mixing shuttle 190, which engages or interfaces with the cam shaft 195. Accordingly, relative ratios of hot and cold water flowing into mixing chamber 205 (via inlets 215 and 220), as determined by the position of mixing shuttle 190, may subsequently exit the mixing chamber 205 via mixing chamber outlet 235. Water flow out of mixing chamber outlet 235 is directed through diaphragm assembly 170 to later exit the valve assembly 247 (via upper valve body outlet 233). As appreciated from each of FIGS. 3-5, water mixing and thermostatic control of water entering the valve assembly 247 occurs within the mixing chamber 205 as rotation of the cam shaft 195 causes FIG. 6 shows a side-cross-sectional view of the thermostatic unit within valve assembly 247 (along line 20-20) near the mixing chamber 205, in a plane defined by water hose 130, structural feature 133, and substantially vertical axis 240 (as in FIG. 5). In FIG. 6, the coupling interfaces among valve assembly 247 components within mixing chamber 205 are shown in greater detail. As shown and described previously, thermostatic wax actuator 185 is housed inside the mixing chamber 205 portion within upper valve body 115. Wax actuator 185 is coupled to or engages with a spring 251, which interfaces with an upper surface 248 of the mixing chamber 205 and a lip feature 249 on wax actuator 185. Spring 251 biases wax actuator 185 toward cam shaft 195, therefore biasing mixing shuttle 190 to a position that permits hot water flow into mixing chamber through hot water inlet 215. Wax actuator 185 is coupled to mixing shuttle 190 via protruding features 253, which engage with wax actuator 185 along ridged interface 252.

Wax actuator 185 further engages with cam shaft 195 at interface 250 via a pin portion 245 extending from the wax actuator 185. In various embodiments, the pin portion 245 may engage with a surface or recessed region of the cam shaft 195. As shown, cam shaft 195 is fitted within an interior channel 242 of the lower valve body 120. The cam shaft 195 is fluidly sealed relative to the lower valve body 120 via O-ring seals 246. The cam shaft 195 also extends through the lower valve body 120 and has an exterior portion 243 that is coupled to handle 230 via fastener 241. Rotation of handle 230 relative to lower valve body 120 further rotates cam shaft 195, which repositions wax actuator 185 and coupled mixing shuttle 190 to adjust hot water flow through inlet 215. Adjustment of handle 230 consequently allows for the corresponding adjustment of maximum water temperature exiting system 100.

Figure 7:
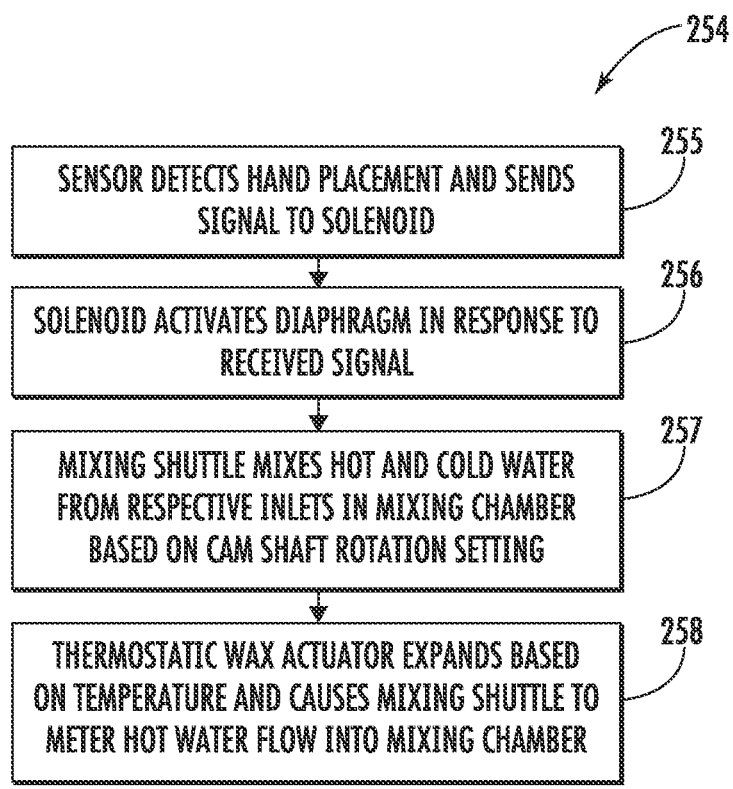
FIG. 7 is a flow diagram of a method of regulating fluid temperature carried out by the thermostatic integrated faucet of FIG. 1, according to an exemplary embodiment.

FIG. 7 shows a method 254 that summarizes operation of integral thermostatic faucet system 100 (within an assembly 200), according to an exemplary embodiment. In operation 255, a sensor (housed within sensor housing 145) detects hand placement (e.g. via proximity, movement, infrared, etc.) below the sensor and sends a signal to a communicatively coupled solenoid assembly (solenoid assembly 150). Signal transmission from the sensor within housing 145 to the solenoid assembly 150 may be facilitated via wired communication (e.g. via wires 140) or wireless communication, according to various exemplary embodiments.

In operation 256, the coupled solenoid assembly 150 subsequently activates a diaphragm 227 within a coupled diaphragm assembly 170 to allow water to flow through and out of the valve assembly 247 (enclosed by upper and lower valve bodies 115 and 120, respectively) to the faucet outlet 105 (and coupled aerator 155).

While diaphragm 227 within diaphragm assembly 170 allows water flow through and out of the valve assembly 247, hot and cold water enters mixing chamber 205 via inlets 215 and 220, respectively. In operation 257, water is mixed within mixing chamber 205 at a relative inflow ratio determined by a position of mixing shuttle 190, which is determined by the cam shaft 195 rotation setting.

In operation 258, thermostatic actuator 185 reacts with mixed water 205 and expands in response to increasing temperature of the mixed water (or when a threshold is reached). The expanded thermostatic actuator 185 consequently adjusts mixing shuttle 190 (via pin portion 245) such that it is repositioned relative to hot water inlet 215. Repositioned mixing shuttle 190 consequently meters hot water flow into mixing chamber 205, preventing further temperature increase of mixed water exiting the valve assembly 247 into the remaining portions of the integrated faucet system 100.

In an alternate example of system 100 operation, the cam shaft 195 may be rotated (using handle 230) prior to operation 255 to preemptively decrease the allowable temperature of water exiting through the faucet outlet 105. The rotation of cam shaft 195 consequently causes the wax actuator 185 and mixing shuttle 190 to reposition such that hot water inflow is decreased and the maximum allowable temperature is also reduced due to a shorted extendable range of the wax actuator 185 within mixing chamber 205.

Figure 8:
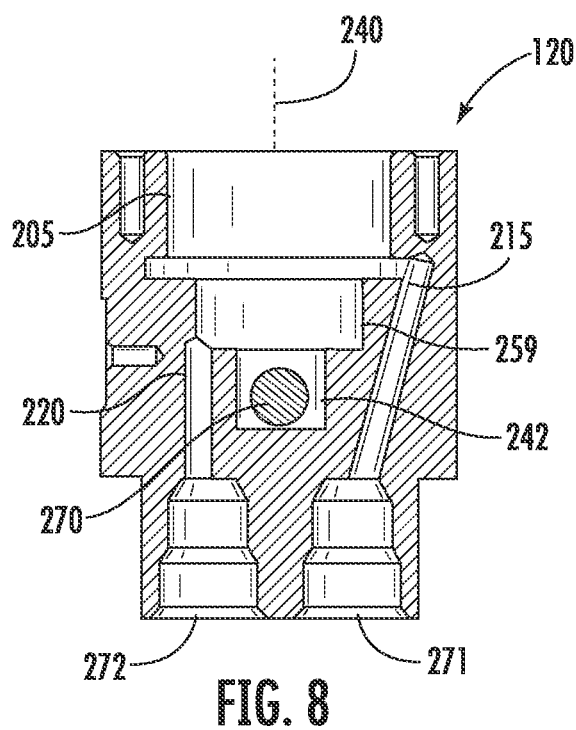
FIG. 8 is a side cross-sectional view of the thermostatic body bottom of the thermostatic integrated faucet of FIG. 1 taken along line 10-10 of FIG. 1, according to an exemplary embodiment.
Figure 9:
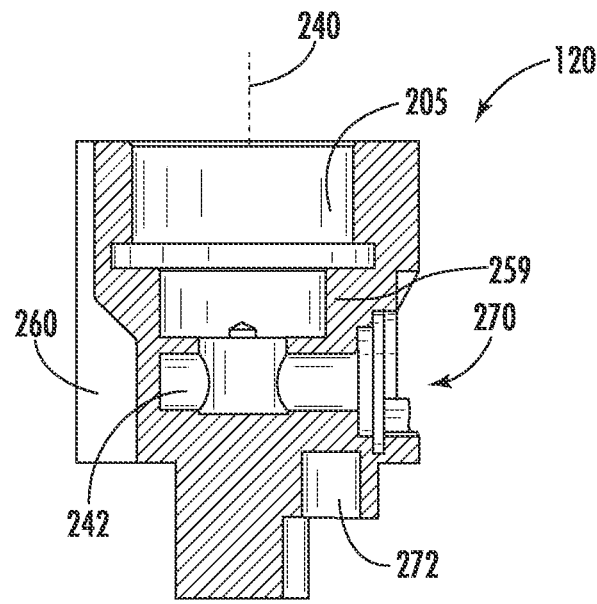
FIG. 9 is a cross-sectional view of the thermostatic body bottom of FIG. 8 taken along line 20-20 of FIG. 1, according to an exemplary embodiment.

FIG. 8-9 show side cross-sectional views of lower valve body 120, according to exemplary embodiments. FIG. 8 shows a side cross-sectional view of lower valve body 120 in a plane defined by hose features 271 and 272 and substantially vertical axis 240 (i.e., along line 10-10 of FIG. 1). Hose feature 271 within lower valve body 120 is configured to receive hot water hose 125, which directs hot water into the valve assembly 247 from an existing supply. Hot water from a coupled hose 125 at feature 271 enters a lower portion of the mixing chamber 205 disposed within lower valve body 120 via inlet 215.

Hose feature 272 within lower valve body 120 is configured to receive cold water hose 130, which directs cold water into the valve assembly 247 from an existing supply. Cold water from a coupled hose 130 at feature 272 enters the lower portion of the mixing chamber 205 disposed within lower valve body 120 via inlet 220.

FIG. 8 additionally illustrates features 259 and 242 within the lower portion of mixing chamber 205, which are configured to interface with mixing shuttle 190 and cam shaft 195. As shown, features 259 and 242 may include one or more recesses or ridges, which may enable housing and engagement of the mixing shuttle 190 and cam shaft 195 therein. Exterior placement portion 270 (e.g., recess, aperture, hole, etc.) within feature 242 facilitates insertion of the cam shaft 195 into valve assembly 247.

FIG. 9 shows a side cross-sectional view of lower valve body 120 in a plane that is parallel to a length of the cam shaft 195 (i.e., along line 20-20 of FIG. 1). FIG. 9 further illustrates relative locations of features 259 and 242 within mixing chamber 205, which interface with mixing shuttle 190 and cam shaft 195, respectively. In addition, FIG. 9 shows guide feature 260 on an exterior surface of lower valve body 120, which facilitates positioning and placement of wires 140 within assembly 200. In addition, FIG. 9 shows exterior placement portion 270, which is configured to receive cam shaft 195 and interface with cam shaft 195 exterior portion 243.

Figure 10:
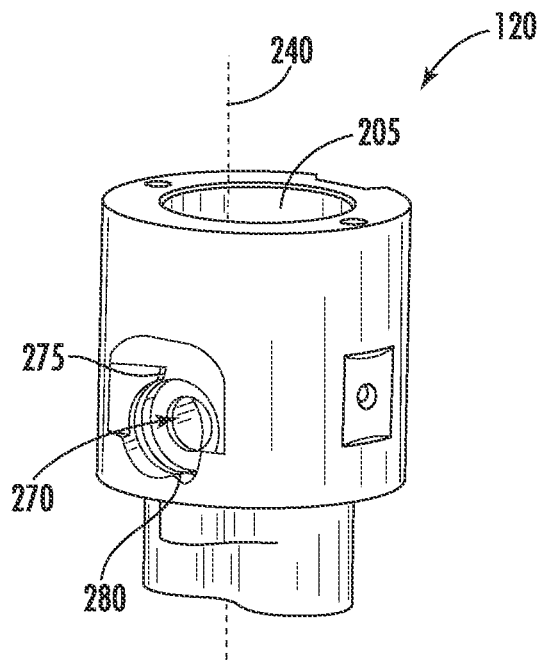
FIG. 10 is a perspective view of the thermostatic body bottom of FIG. 8, according to an exemplary embodiment.
Figure 11:
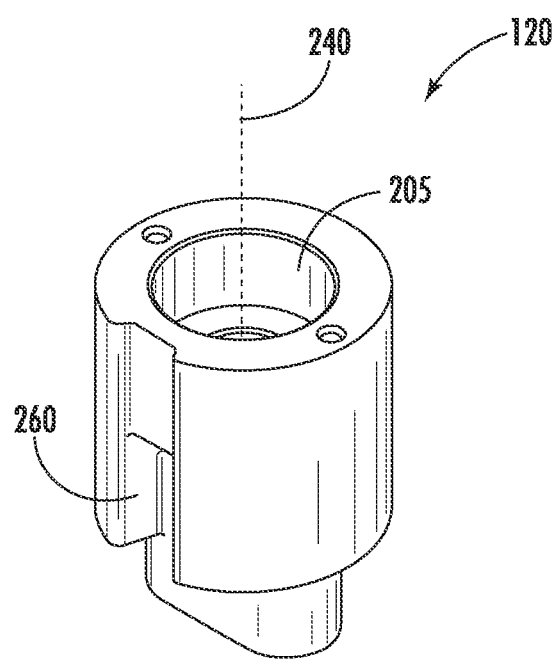
FIG. 11 is a perspective view of the thermostatic body bottom of FIG. 8, according to an exemplary embodiment.

FIGS. 10-11 show perspective views of lower valve body 120, according to exemplary embodiments. FIG. 10 further illustrates exterior placement portion 270, which interfaces with cam shaft 195 exterior portion 243 during operation. Features 275 and 280 within exterior portion 270 are configured to facilitate rotational locking of cam shaft 195 after insertion. In various embodiments, features 275 and/or 280 may be one or more recessed portions disposed within or near the exterior placement portion 270. Locking cam shaft 195 to prevent rotational movement enables water temperature within the system 100 to be preset.

FIG. 11 shows a perspective view of lower valve body 120 opposite the view shown in FIG. 10, according to an exemplary embodiment. FIG. 10 further illustrates the location and configuration of guide feature 260 on the exterior of lower valve body 120. As shown, guide feature 260 may be a recess disposed within lower valve body 120 having one or more ridges, ledges, and/or lips to facilitate positioning and placement (or receiving and retaining) of wires 140 therein.

Figure 12:
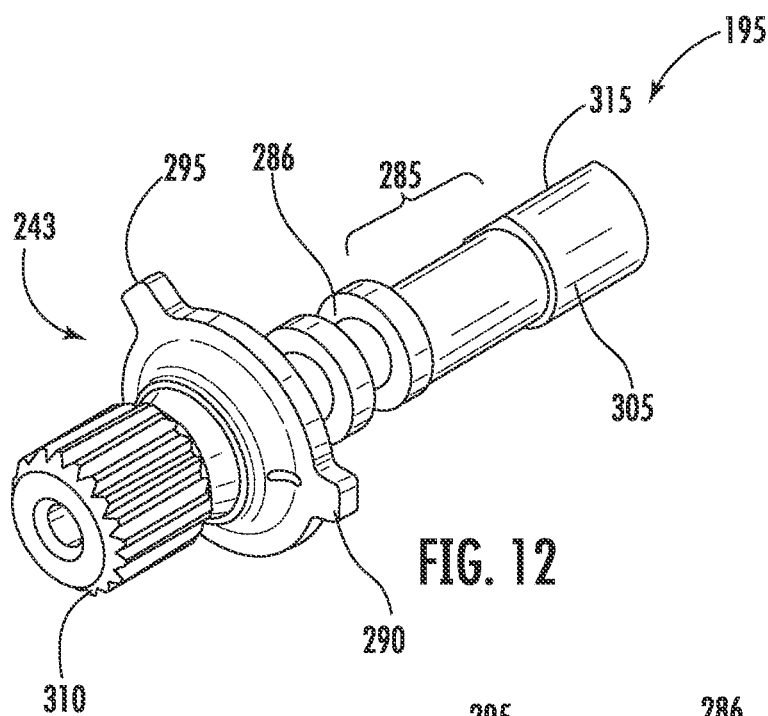
FIG. 12 is a perspective view of the thermostatic cam shaft of the thermostatic integrated faucet of FIG. 1, according to an exemplary embodiment.

FIG. 12 shows a perspective view of cam shaft 195, according to an exemplary embodiment. The cam shaft 195 is configured to include an end portion 305, which inserts into valve assembly 247 via exterior placement portion 270 and interfaces with recess or feature 242 in lower valve body 120. End portion 305 is configured to include slanted feature 315, which facilitates ease of insertion into and removal from valve assembly 247 within system 100. The cam shaft 195 is further configured to include shaft section 285, which is configured to be coupled or interface with pin portion 245 of wax actuator 185. The cam shaft 195 includes features 286, in between which O-ring seals 246 may be placed to facilitate fluid sealing of cam shaft 195 relative to lower valve body 120. In various embodiments, the features 286 may include one or more ridges, lips, ledges, protrusions, which may extend radially from a central axis of the cam shaft 195. Outer portion 243 of cam shaft 195 may be configured to remain on the exterior of lower valve body 120, interfacing with exterior placement portion 270. Outer portion 243 of cam shaft 195 may include tabs 295 and 290, which may interface with lower valve body 120 features 275 and/or 280, respectively, to facilitate rotational locking of cam shaft 195. Knob portion 310 of cam shaft 195 may be configured to include one or more ridges or splines to facilitate interfacing and engagement with handle 230.

Figure 13:
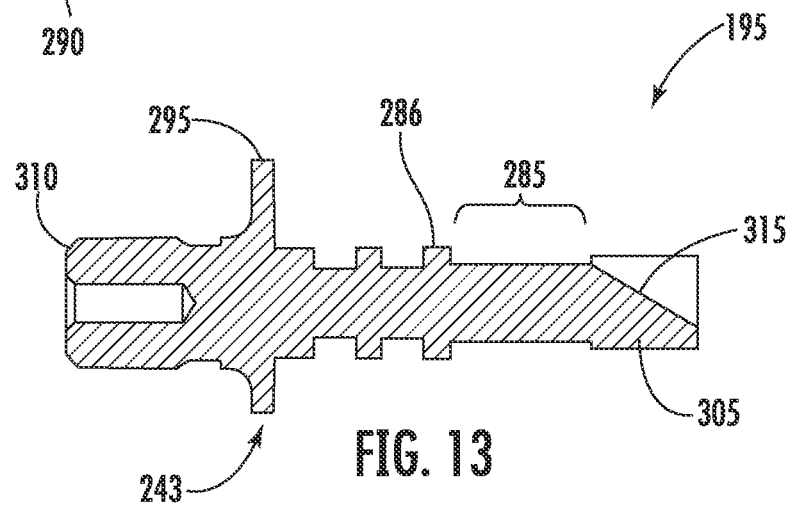
FIG. 13 is a side cross-sectional view of the thermostatic cam shaft of FIG. 12 taken along line 20-20 of FIG. 1, according to an exemplary embodiment.

FIG. 13 shows a side cross-sectional view of cam shaft 195 (taken along line 20-20 of FIG. 1), according to an exemplary embodiment. FIG. 13 further illustrates end portion 305, which inserts into valve assembly 247 and includes slanted feature 315 to ease insertion. Features 285 and 286 of cam shaft 195 interface with feature 242 within lower valve body 120. Feature 285 additionally interfaces with wax actuator 185 and features 286 facilitates O-ring placement to fluidly seal cam shaft 195 relative to lower valve body 120. As described, outer portion 243 includes knob 310 to facilitate turning cam shaft 195. In various embodiments, the feature 285 may have a tapered surface to cause the wax actuator 185 to change in position with rotation of the cam shaft 195.

Figure 14:
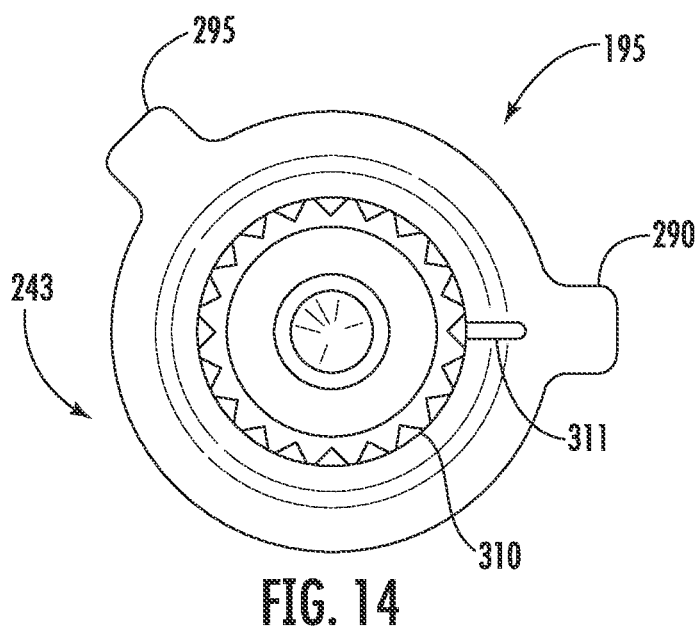
FIG. 14 is a front view of the thermostatic cam shaft of FIG. 12, according to an exemplary embodiment.

FIG. 14 shows an end view of cam shaft 195, according to an exemplary embodiment. FIG. 14 further illustrates the configuration of knob 310 and tabs 295 and 290 on exterior portion 243 of cam shaft 195. Additionally, FIG. 14 highlights feature 311 present on exterior portion 243, which may facilitate reproducible water temperature setting within system 100. Feature 311 may be an indentation, protrusion, marking, or any other suitable indication that a particular rotation of cam shaft 195 relative to lower valve body 120 has been achieved.

Figure 15:
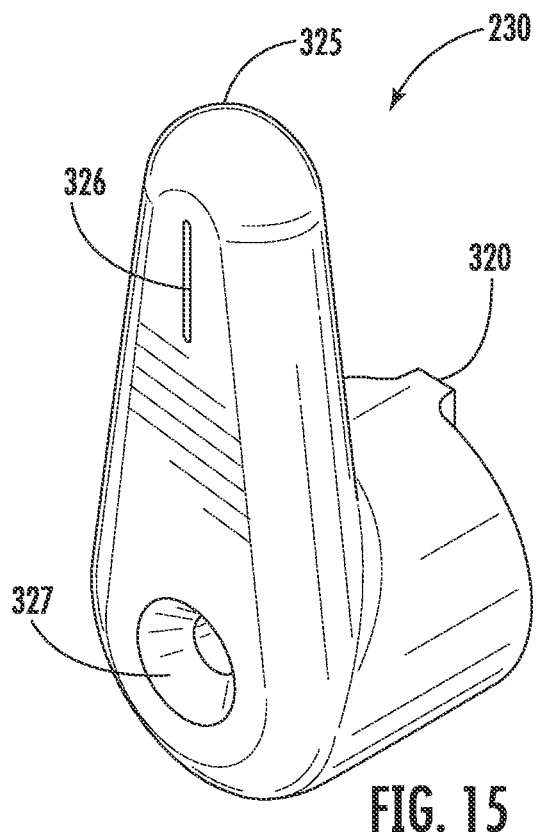
FIG. 15 is a perspective view of the thermostatic cam handle, according to an exemplary embodiment.

FIG. 15 shows a perspective view of handle 230, according to an exemplary embodiment. Handle 230 includes extended feature 325, which facilitates ease of rotation of handle 230 and coupled cam shaft 195. Feature 327 (e.g., recess, aperture, etc.) on handle 230 is configured to receive fastener 241, which facilitates coupling handle 230 to cam shaft 195 (e.g., into knob portion 310). Protruding (e.g., extruded) feature 320 may be configured to limit rotation of handle 230 and, consequently, limit rotation of cam shaft 195 to enable water temperature limit setting by the thermostatic unit within valve assembly 247 and system 100. Indicator 326 on extended feature 325 may facilitate reproducible water temperature setting by the thermostatic unit within system 100. Indicator 326 may be an indentation, protrusion, marking, alphabetical or numerical indicia, or any other suitable indication that a particular rotation of handle 230 has been achieved. In various exemplary embodiments, handle 230 may be removed after a desired water temperature setting is established. In additional exemplary embodiments, a cap or cover could be coupled to assembly 200 (and system 100) in lieu of handle 230 to prevent and/or restrict undesirable rotation of cam shaft 195. Removal or replacement of handle 230 could increase resistance of assembly 200 (and system 100) to vandalism and prevent undesired, unauthorized, or unintentional manipulation of temperature settings within system 100.

Figure 16:
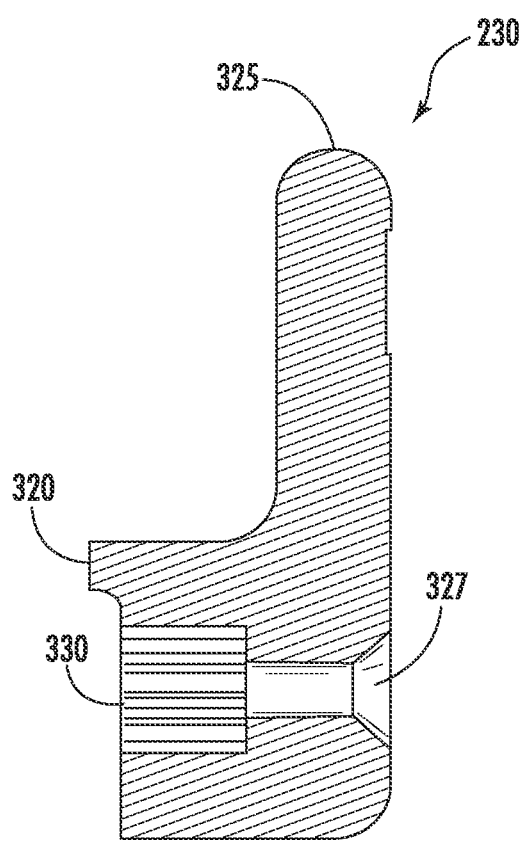
FIG. 16 is a side cross-sectional view of the thermostatic cam handle of FIG. 15, according to an exemplary embodiment.

FIG. 16 shows a side cross-sectional view of handle 230, according to an exemplary embodiment. FIG. 16 further illustrates protruding feature 320, which facilitates water temperature limit settings. Handle 230 includes inner surface 330, which may include one or more ridges or splines configured to interface or engage with ridges or splines on knob 310 of cam shaft 195.

Figure 17:
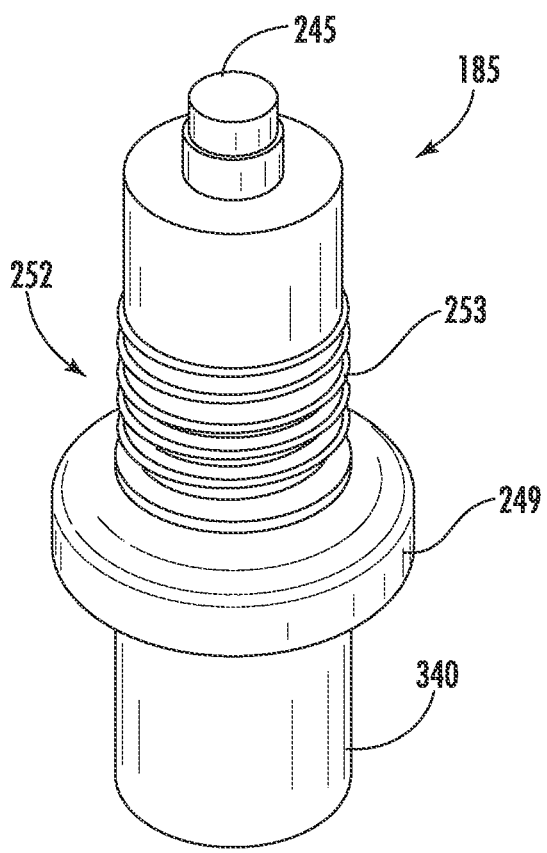
FIG. 17 is a perspective view of the thermostatic wax actuator of the thermostatic integrated faucet of FIG. 1, according to an exemplary embodiment.

FIG. 17 shows a perspective view of thermostatic wax actuator 185, according to an exemplary embodiment. Wax actuator 185 is configured to have pin portion 245, which interfaces with cam shaft portion 285 within mixing chamber 205. Wax actuator 185 also includes protruding features 253 along ridged interface 252, which interfaces and engages with mixing shuttle 190. Wax actuator 185 also includes lip feature 249, which is configured to interface with spring 251 when housed within mixing chamber 205 to enable biasing of the wax actuator 185 toward the cam shaft 195. Wax portion 340 on wax actuator 185 expands (e.g., increases in length) with increased temperature and is configured to be positioned within the coils of spring 251. When wax portion 340 expands, pin 245 is pushed into cam shaft 190 and correspondingly, mixing shuttle 190 is adjusted to meter hot water flowing into mixing chamber 205. In various exemplary embodiments, wax portion 340 is configured to be situated near pin 245 such that a distance between the components is minimal, thereby enabling a reduced response time of system 100 to water temperature changes. In various embodiments, wax portion 340 is configured to maintain constant contact with pin 245.

Figure 18:
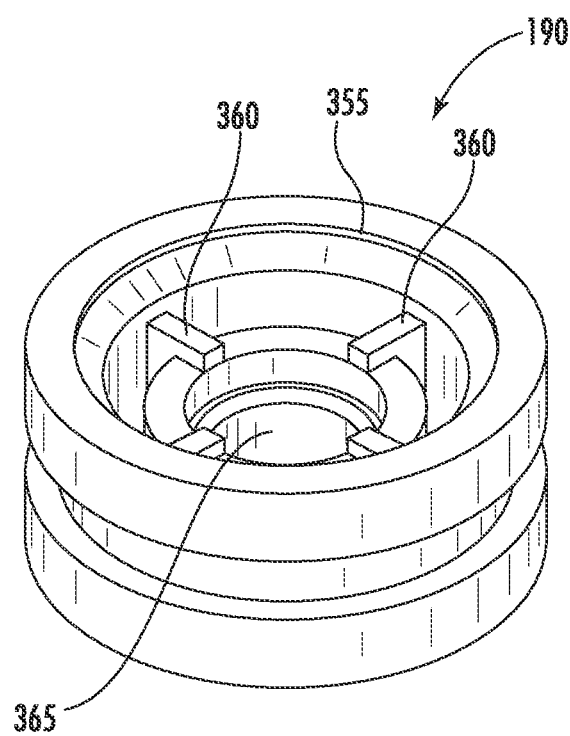
FIG. 18 is a perspective view of the thermostatic mixing shuttle of the thermostatic integrated faucet of FIG. 1, according to an exemplary embodiment.
Figure 19:
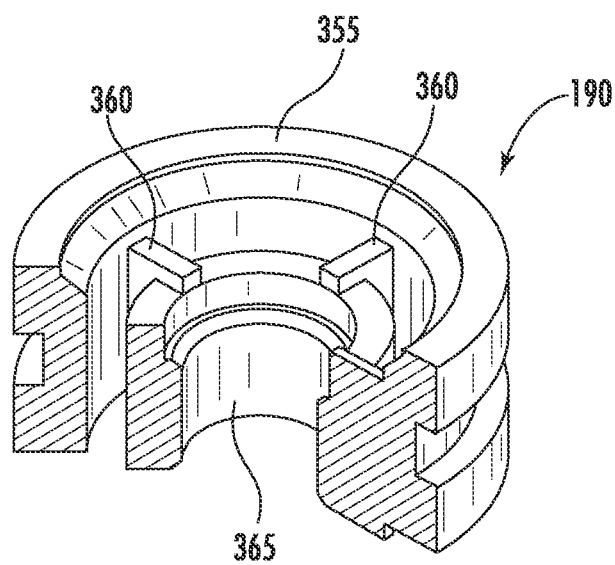
FIG. 19 is a partial cross-sectional view of the thermostatic mixing shuttle of FIG. 18, according to an exemplary embodiment.

FIGS. 18-19 show perspective and partial cross-sectional views, respectively, of mixing shuttle 190, according to exemplary embodiments. Mixing shuttle 190 includes surface 355, which is configured to be coupled or engage with wax actuator 185 to enable thermostatic mixing of hot and cold water entering mixing chamber 205. Inner surface 365 of mixing shuttle 190 is configured to abut and engage with interface 252 on wax actuator 185. Fins 360, and/or other similar features included within mixing shuttle 190, are configured to facilitate sufficient mixing of hot and cold water entering mixing chamber 205. FIG. 19 further illustrates fins 360 located near an inner surface 365 within mixing shuttle 190.

Figure 20:
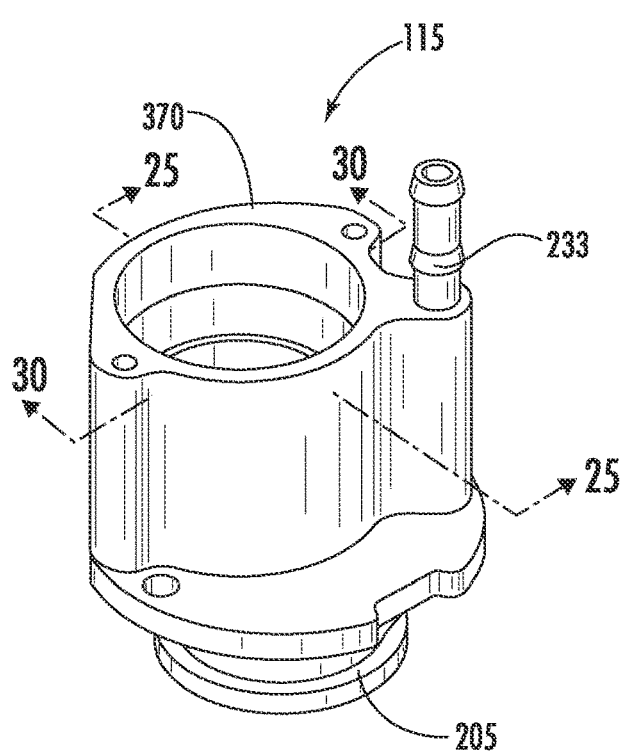
FIG. 20 is a perspective view of the thermostatic body top of the thermostatic integrated faucet of FIG. 1, according to an exemplary embodiment.

FIG. 20 shows a perspective view of upper valve body 115, according to an exemplary embodiment. Upper valve body 115 includes an upper chamber 370, which is configured to house diaphragm assembly 170. Upper valve body 115 is also configured to form mixing chamber 205, when coupled to lower valve body 120. Mixed water exiting mixing chamber 205 passes through diaphragm assembly 170 (housed within upper chamber 370) to exit upper valve body 115 via outlet 233.

Figure 21:
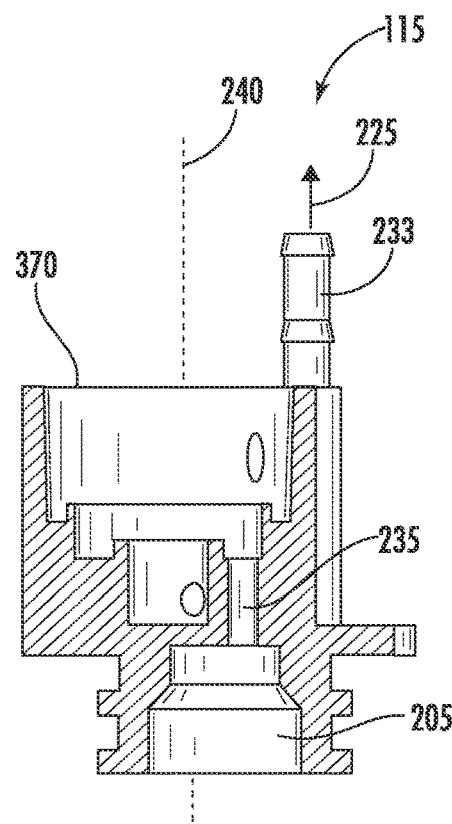
FIG. 21 is a cross-sectional view of the thermostatic body top of FIG. 20 taken along line 25-25 of FIG. 20, according to an exemplary embodiment.
Figure 22:
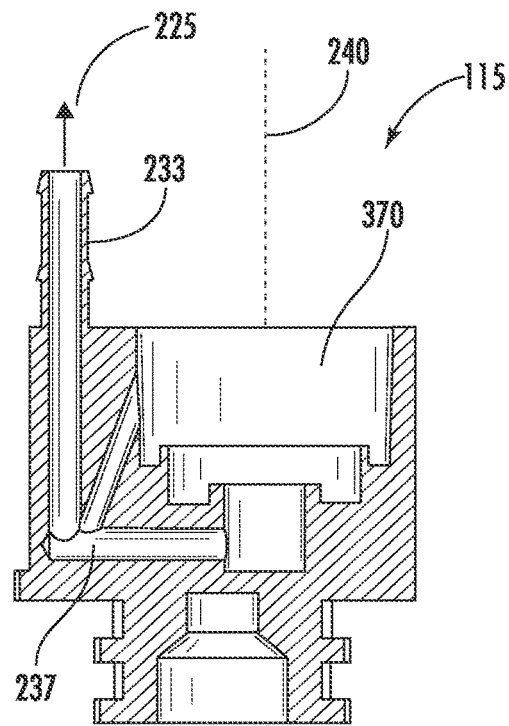
FIG. 22 is a cross-sectional view of the thermostatic body top of FIG. 20 taken along line 15-15 of FIG. 1, according to an exemplary embodiment.
Figure 23:
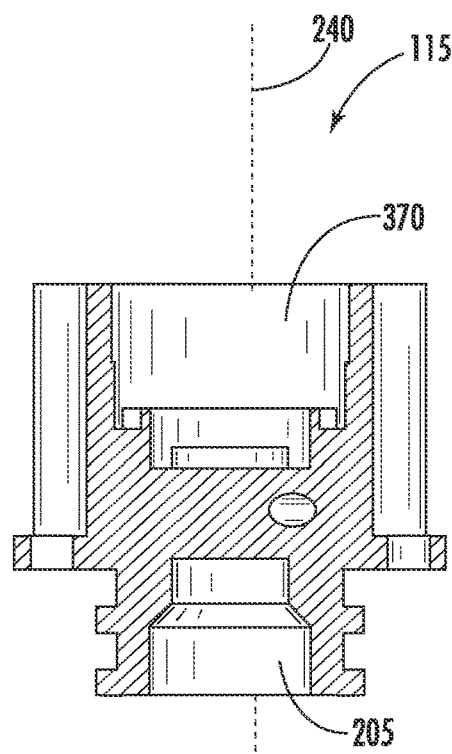
FIG. 23 is a cross-sectional view of the thermostatic body top of FIG. 20 taken along line 30-30 of FIG. 1, according to an exemplary embodiment.

FIGS. 21-23 show side cross-sectional views of upper valve body 115, according to exemplary embodiments. FIG. 21, which shows a cross-sectional view of the upper valve body 115 taken along line 25-25 of FIG. 20, further illustrates upper chamber 370 disposed within upper valve body 115. Upper chamber 370 receives mixed water from mixing chamber 205 via mixing chamber outlet 235. After mixed water passes through diaphragm assembly 170 housed within upper chamber 370, the mixed water exits the upper valve body via outlet 233 toward faucet spout conduit or tubing 110 in a flow direction 225. In various exemplary embodiments, outlet 233 may be coupled to flexible tube hose to route water toward faucet outlet 105.

FIG. 22, which shows a cross-sectional view of the upper valve body 115 taken along line 15-15 of FIG. 1, further illustrates water flow passageways out of upper chamber 370 within upper valve body 115, highlighting outlet passageway 237. Mixed water flows through outlet passageway 237 in a flow direction 225 toward faucet spout tubing 110. FIG.

23, which shows a cross-sectional view of the upper valve body 115 taken along line 30-30 of FIG. 20, illustrates the relative positions of mixing chamber 205 to upper chamber 370 within upper valve body 115.

Figure 24:
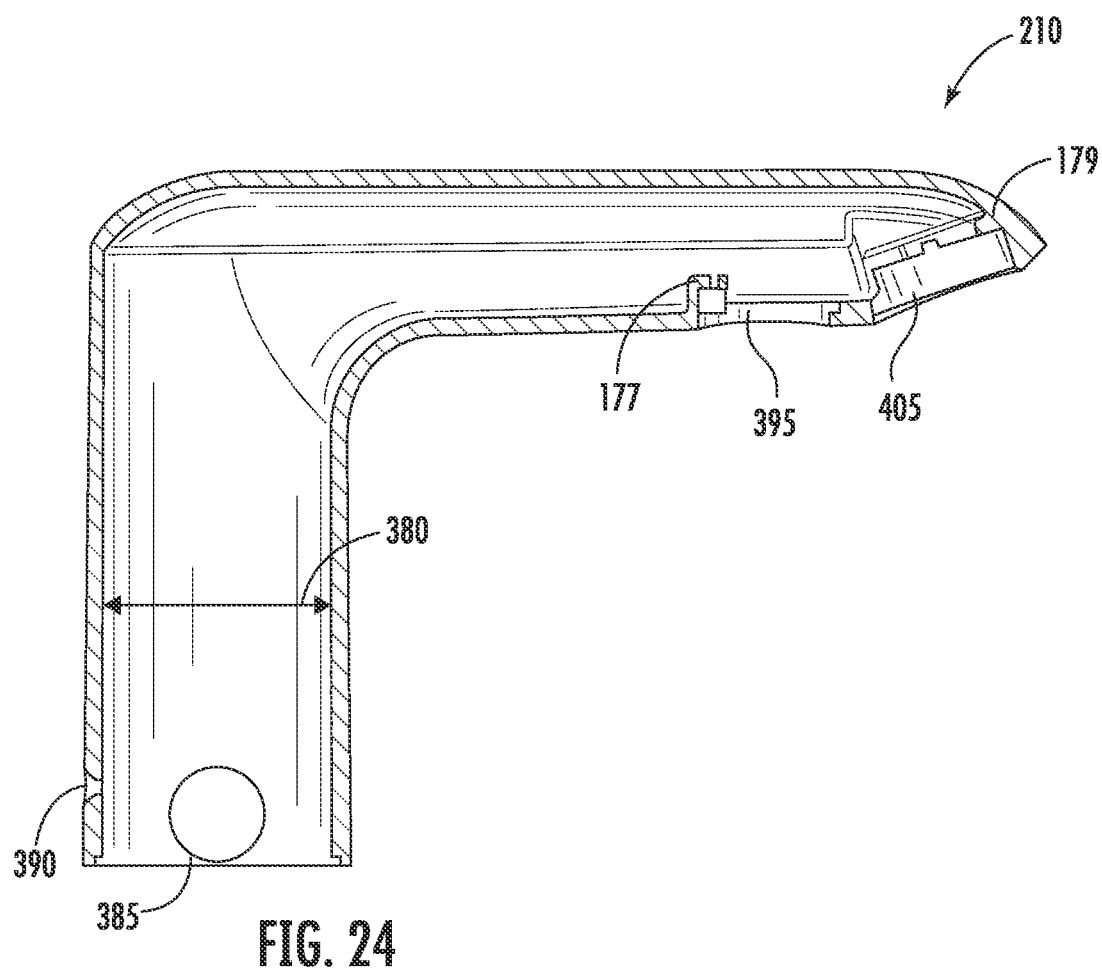
FIG. 24 is a side cross-sectional view of the faucet spout body of the thermostatic faucet assembly of FIG. 2, according to an exemplary embodiment.

FIG. 24 shows a side cross-sectional view of faucet spout body 210, according to an exemplary embodiment. FIG. 24 depicts an exemplary faucet spout body 210 that may be coupled with integrated faucet system 100. Body 210 includes a hollowed out inner surface with an inner dimension 380 to enable housing of system 100 therein. Body 210 includes attachment fixtures 177 and 179, which are configured to facilitate coupling and placement of sensor housing 145 and aerator 155, respectively. Attachment fixture 177 may be a protrusion, a bracket, or another suitable feature located on an interior surface of body 210 to which sensor housing 145 may be attached (e.g. via one or more fasteners). Attachment fixture 179 is located near a terminal end of body 210, on an interior surface. Attachment fixture 179 may be a protrusion, bracket, or other shaped feature within body 210 that facilitates placement and installation of aerator 155, which is coupled to faucet outlet 105. Feature 395 within body 210 is configured to receive sensor housing 145 to facilitate control of solenoid assembly 150. Recessed feature 405 is configured to receive and interface with an outer surface of aerator 155 housed within body 210. Hole 385 within body 210 is configured to receive coupled cam shaft 195 and handle 230, which in turn are configured to facilitate control of water temperature within system 100. Faucet spout body 210 also includes feature 390 (e.g., aperture, hole, recess, etc.) which is configured to receive a coupled fastener, such as a set screw.

Figure 25:
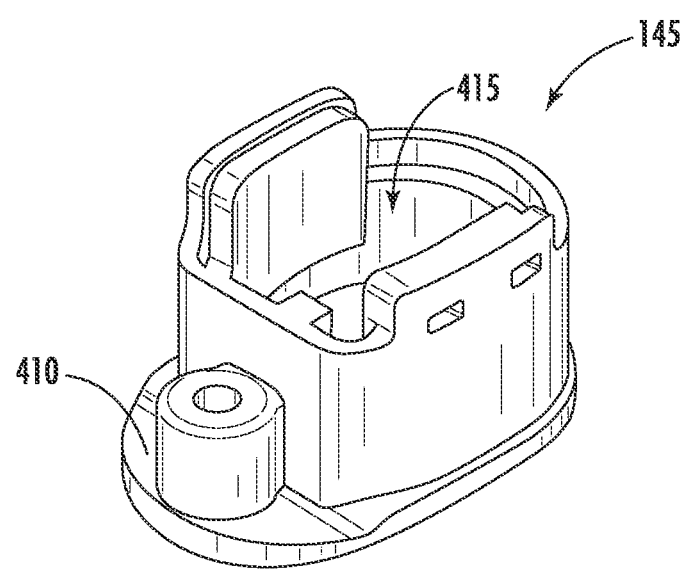
FIG. 25 is a perspective view of the sensor assembly of the thermostatic integrated faucet of FIG. 1, according to an exemplary embodiment.

FIG. 25 shows a perspective view of sensor housing 145, according to an exemplary embodiment. FIG. 25 depicts an exemplary sensory housing configuration that may be included within integrated faucet system 100. Sensor housing 145 includes an inner cavity 415, which is configured to house a sensor. The sensor housed within sensor housing 145 may be a proximity sensor, infrared sensor, movement sensor, or any other suitable sensor sufficient for detecting the placement of a hand or other object underneath said sensor. Sensor housing 145 includes feature 410, which is configured to facilitate coupling of sensor housing 145 to system 100 and/or faucet spout body 210. Sensor housing 145 may be coupled to body 210 via attachment fixture 177 (e.g. via one or more fasteners).

Figure 26:
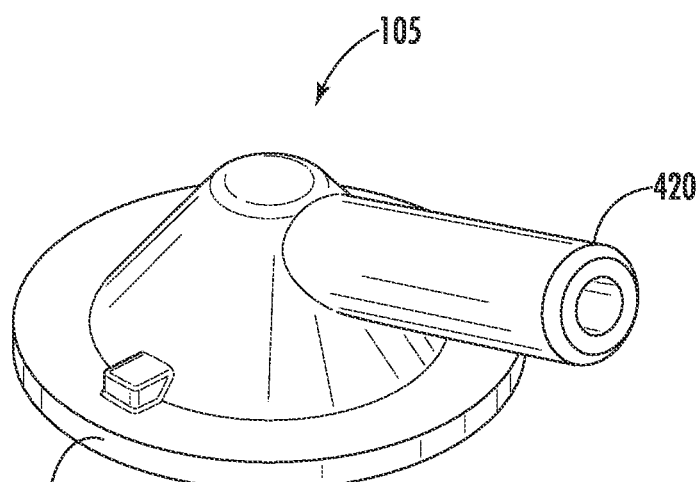
FIG. 26 is a perspective view of the faucet outlet aerator of the thermostatic integrated faucet of FIG. 1, according to an exemplary embodiment.

FIG. 26 shows a perspective view of faucet outlet 105, according to an exemplary embodiment. FIG. 26 depicts an exemplary faucet outlet that may be included within integrated faucet system 100. Outlet 105 includes nozzle inlet 420, which is configured to be coupled to faucet spout tubing 110 via quick connector 175. The configuration of nozzle inlet 420 may facilitate ease of positioning of components within system 100, such as the relative configuration of faucet spout body 210 and sensor housing 145. Outlet 105 also includes feature 425, which is configured to be coupled to aerator 155.

Figure 27:
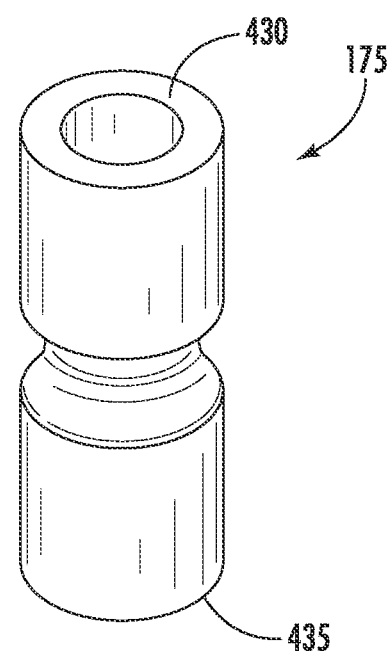
FIG. 27 is a perspective view of the quick connector of the thermostatic integrated faucet of FIG. 1, according to an exemplary embodiment.

FIG. 27 shows a perspective view of quick connector 175, according to an exemplary embodiment. FIG. 27 depicts an exemplary quick connector that may be included within integrated faucet system 100. Quick connector 100 is configured to have two ends 430 and 435 that enable coupling of faucet outlet 105 to faucet spout tubing 110. In various embodiments, end 430 may receive the faucet outlet 105 and end 435 may receive the faucet spout tubing 110.

Figure 28:
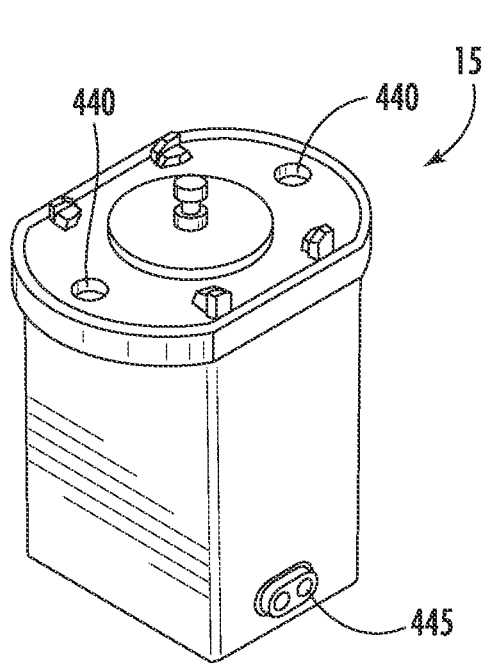
FIG. 28 is a perspective view of the solenoid assembly of the thermostatic integrated faucet of FIG. 1, according to an exemplary embodiment.

FIG. 28 shows a perspective view of solenoid assembly 150, according to an exemplary embodiment. FIG. 28 depicts an exemplary solenoid assembly that may be included within integrated faucet system 100. Solenoid assembly 150 is configured to be coupled to diaphragm assembly 170 via features 440. Solenoid assembly 150 also includes feature 445, which facilitates receipt of signals from a sensor within sensor housing 145, via wires 140.

Figure 29:
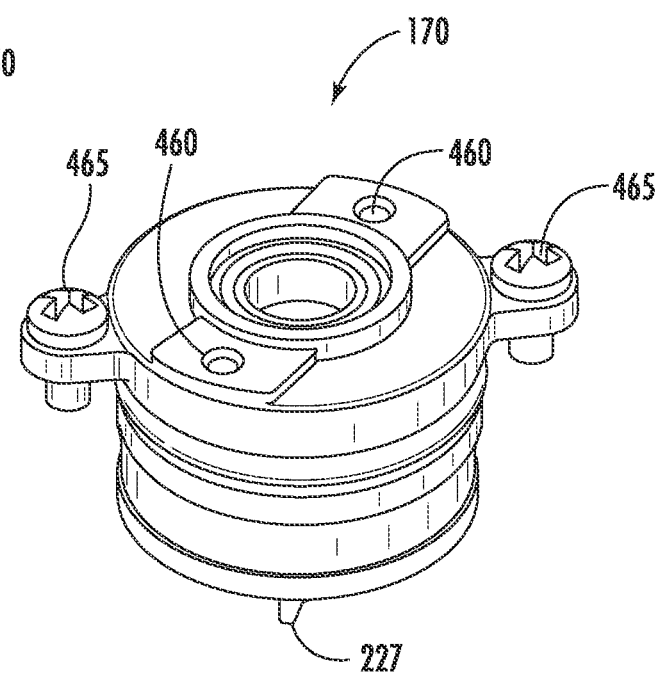
FIG. 29 is a perspective view of the diaphragm assembly of the thermostatic integrated faucet of FIG. 1, according to an exemplary embodiment.

FIG. 29 shows a perspective view of diaphragm assembly 170, according to an exemplary embodiment. FIG. 29 depicts an exemplary diaphragm assembly that may be included within integrated faucet system 100. Diaphragm assembly 170 is configured to be housed within upper chamber 370 of upper valve body 115. Diaphragm assembly 170 is configured to be coupled to upper valve body 115 via fasteners 465 and to solenoid assembly via features 460. The diaphragm assembly 170 includes diaphragm 227, which is configured to control water flow through system 100.

Figure 30:
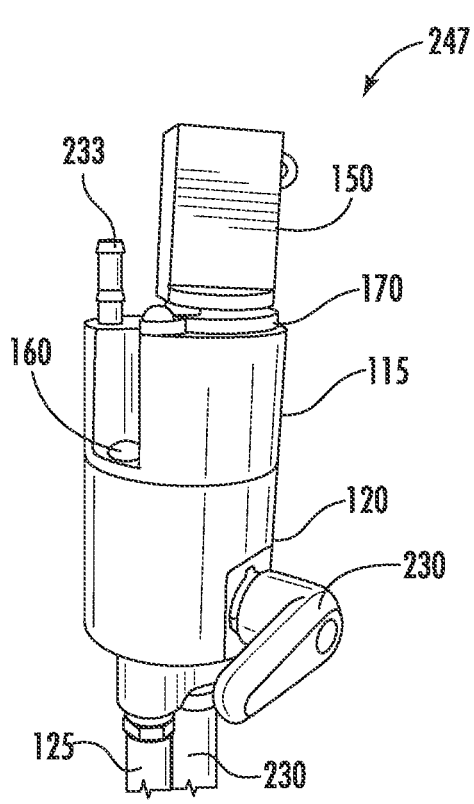
FIG. 30 is a side view of a thermostatic integrated faucet, according to another exemplary embodiment.
Figure 31:
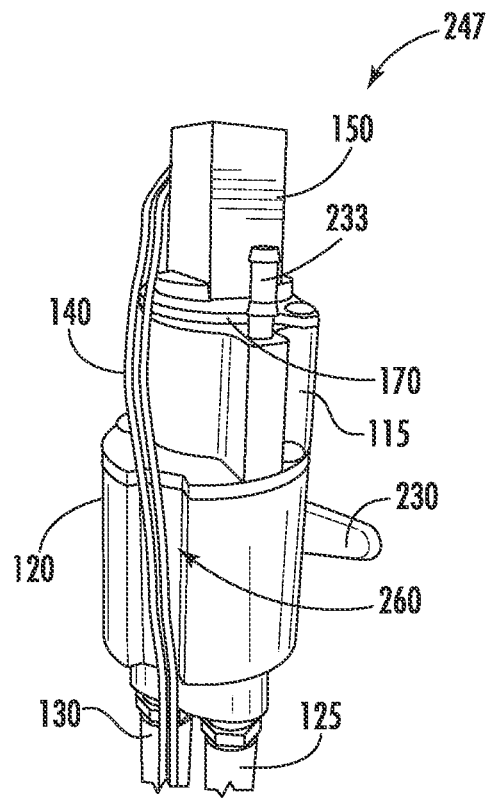
FIG. 31 is a side view of the thermostatic integrated faucet of FIG. 30, according to another exemplary embodiment.

FIGS. 30 and 31 show alternate perspective views of valve assembly 247 within system 100, according to exemplary embodiments. FIGS. 30 and 31 illustrate the configuration of valve assembly components. As shown, hot and cold water hoses 125 and 130, respectively provide water flow into lower valve body 120 and upper valve body 115, at relative ratios determined by handle 230, which consequently controls a temperature of water within the system 100. Solenoid assembly 150 and diaphragm assembly 170, which are coupled to upper valve body 115, may enable water to flow out of valve bodies 115 and 120 via outlet 233.

Figure 32:
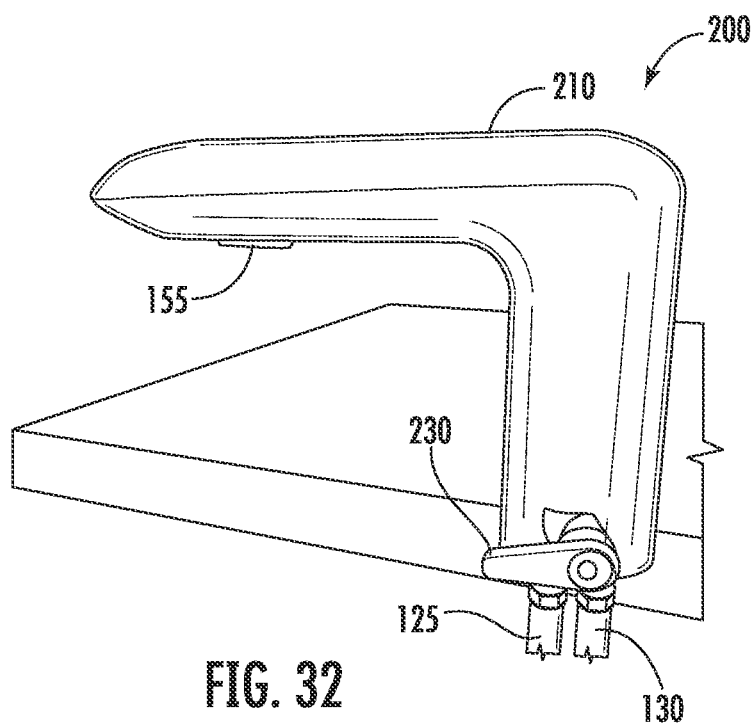
FIG. 32 is a side view of a thermostatic integrated faucet assembly containing the thermostatic integrated faucet of FIG. 30, according to another exemplary embodiment.

FIG. 32 shows a side view of integrated faucet assembly 200, according to an exemplary embodiment. FIG. 32 shows water hoses 125 and 130, which supply water to system 100 housed within faucet spout body 210. Water mixed within the integrated thermostatic faucet system 100, having a temperature controlled by the handle 230 (i.e., via the thermostatic unit within the valve assembly 247), may then exit system 100 (within assembly 200) via exposed aerator 155.

In various embodiments, the thermostatic integrated system 100 may be couplable to a controller to control one or more operations thereof (e.g., method 254), wherein the controller may be a non-transitory computer readable medium or processor having computer-readable instructions stored thereon that when executed, cause the controller to carry out operations (e.g., operations 255-258 of method 254) called for by the instructions. In various embodiments, the controller may be a computing device. The controller may include and/or be couplable to a power source, a memory, a communications interface, and/or a processor. In other embodiments, the controller may include additional, fewer, and/or different components.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A thermostatic integrated faucet comprising:
   a valve assembly having an upper valve body and a lower valve body defining a mixing chamber therein, the mixing chamber configured to receive hot and cold water through a hot water inlet and a cold water inlet, respectively;
   a diaphragm assembly fluidly coupled to the mixing chamber;
   a sensor operatively coupled to the diaphragm assembly, wherein the diaphragm assembly is configured to control a water flow through the valve assembly responsive to an input received by the sensor;
   a thermostatic unit disposed within the mixing chamber of the valve assembly, wherein the thermostatic unit is configured to control a water temperature within the valve assembly; and
   a cam shaft coupled to the thermostatic unit, the cam shaft configured to control a range of the water temperature within the valve assembly.

2. The thermostatic integrated faucet of claim 1, wherein the thermostatic unit comprises:
   a wax actuator configured to engage with the cam shaft; and
   a mixing shuttle coupled to the wax actuator.

3. The thermostatic integrated faucet of claim 2, wherein the mixing shuttle comprises one or more fins that are configured to facilitate mixing of water within the mixing chamber.

4. The thermostatic integrated faucet of claim 2, wherein the wax actuator is biased toward the cam shaft by a spring.

5. The thermostatic integrated faucet of claim 4, wherein the spring is configured to interface with an upper surface of the mixing chamber and a lip of the wax actuator.

6. The thermostatic integrated faucet of claim 1, wherein the thermostatic unit is configured control the water temperature within the mixing chamber by obscuring the hot water inlet based on a temperature of water within the mixing chamber.

7. The thermostatic integrated faucet of claim 1, wherein the sensor is disposed adjacent a faucet outlet.

8. The thermostatic integrated faucet of claim 1, wherein the diaphragm assembly is configured to be activated by a solenoid assembly responsive to the input received by the sensor.

9. The thermostatic integrated faucet of claim 1, wherein the cam shaft is coupled to a handle that is configured to rotate the cam shaft, wherein rotating the cam shaft adjusts the range of the water temperature within the valve assembly.

10. A thermostatic integrated faucet comprising:
    a valve assembly having an upper valve body and a lower valve body defining a mixing chamber, the mixing chamber configured to receive hot water through a hot water inlet and cold water through a cold water inlet;
    a wax actuator disposed within the mixing chamber;
    a mixing shuttle coupled to the wax actuator within the mixing chamber, wherein the wax actuator is configured to adjust a position of the mixing shuttle to control a water temperature within the mixing chamber;
    a cam shaft coupled to the wax actuator, wherein the cam shaft is configured such that rotation of the cam shaft determines a range of the water temperature;
    a diaphragm assembly fluidly coupled to the mixing chamber; and
    a sensor operatively coupled to the diaphragm assembly, wherein the diaphragm assembly is configured to control a water flow through the valve assembly responsive to an input received by the sensor.

11. The thermostatic integrated faucet of claim 10, wherein the wax actuator is configured to expand in response to an increase in temperature of water within the mixing chamber.

12. The thermostatic integrated faucet of claim 11, wherein the mixing shuttle is configured to obscure a hot water inlet fluidly coupled to the mixing chamber responsive to expansion of the wax actuator.

13. The thermostatic integrated faucet of claim 10, wherein the wax actuator is coupled to the mixing shuttle at a ridged interface.

14. The thermostatic integrated faucet of claim 10, wherein the wax actuator comprises a pin portion that is configured to engage with the cam shaft.

15. The thermostatic integrated faucet of claim 10, wherein the cam shaft is coupled to a handle at a knob portion, wherein the knob portion comprises one or more splines that are configured to engage with the handle.

16. The thermostatic integrated faucet of claim 10, wherein the wax actuator is biased toward the cam shaft via a spring.

17. The thermostatic integrated faucet of claim 16, wherein the spring is disposed within the mixing chamber such that the spring interfaces with an upper surface of the mixing chamber and a lip of the wax actuator.

18. A method for controlling a temperature of water within a faucet, the method comprising:
   sensing, by a sensor within the faucet, a first signal indicative of a user proximity;
   sending, by the sensor, a second signal to a solenoid assembly responsive to the sensed first signal, wherein the solenoid assembly is coupled to a diaphragm assembly; and
   controlling, by the solenoid assembly, the diaphragm assembly to open a water passageway in fluid communication with a valve assembly;
   wherein the valve assembly comprises:
      an upper valve body and a lower valve body defining a mixing chamber that is configured to receive hot and cold water;
      a thermostatic unit disposed within the mixing chamber and configured to control a water temperature within the valve assembly; and
      a cam shaft coupled to the thermostatic unit and configured to control a range of the water temperature within the valve assembly.

19. The method of claim 18, wherein the thermostatic unit comprises an expandable wax actuator coupled to a mixing shuttle and configured to engage with the cam shaft, wherein the expandable wax actuator displaces the mixing shuttle as it expands upon reaction with the hot water, and wherein an amount of expansion of the expandable wax actuator is determined based on a rotation of the cam shaft.

* * * * *